US007644189B2

(12) United States Patent
Canal et al.

(10) Patent No.: US 7,644,189 B2
(45) Date of Patent: Jan. 5, 2010

(54) METHOD FOR UPGRADING NETWORK SERVER PROGRAMMING CONDITIONS, ASSOCIATED SYSTEM AND SOFTWARE PRODUCT

(75) Inventors: Gianni Canal, Turin (IT); Alberto Cuda, Turin (IT)

(73) Assignee: Telecom Italia S.p.A., Milan (IT)

( * ) Notice: Subject to any disclaimer, the term of this patent is extended or adjusted under 35 U.S.C. 154(b) by 712 days.

(21) Appl. No.: 10/472,416

(22) PCT Filed: Mar. 12, 2002

(86) PCT No.: PCT/IT02/00152

§ 371 (c)(1),
(2), (4) Date: Sep. 18, 2003

(87) PCT Pub. No.: WO02/076020

PCT Pub. Date: Sep. 26, 2002

(65) Prior Publication Data

US 2004/0088693 A1 May 6, 2004

(30) Foreign Application Priority Data

Mar. 21, 2001 (IT) .......................... TO2001A0264

(51) Int. Cl.
*G06F 15/16* (2006.01)
*G06F 9/44* (2006.01)

(52) U.S. Cl. ...................... 709/250; 717/168; 717/170; 717/171

(58) Field of Classification Search ................. 709/250; 717/168, 169, 170, 171, 172, 173, 174, 175, 717/176; 370/252, 392, 469, 473
See application file for complete search history.

(56) References Cited

U.S. PATENT DOCUMENTS 5,359,730 A * 10/1994 Marron ........................ 717/169

(Continued)

FOREIGN PATENT DOCUMENTS

WO     WO 00/72528     11/2000

OTHER PUBLICATIONS

Feng, N.; Ao, G.; White, T.; Pagurek, B. "Dynamic Evolution of Network Management Software by Software Hot-Swapping." 2001. IEEE, Session Two Mobile Code, pp. 63-76.*

(Continued)

*Primary Examiner*—William C Vaughn, Jr.
*Assistant Examiner*—Scott Christensen
(74) *Attorney, Agent, or Firm*—Finnegan, Henderson, Farabow, Garrett & Dunner, L.L.P

(57) ABSTRACT

A network server having a current lower packet-interfacing layer and a current upper packet-processing layer is updated by providing an updated process having an updated packet-interfacing lower layer, an updated packet-processing upper layer packets, and a communication channel for diverting network packets from the updated lower layer to the current upper layer. First the current lower layer is replaced with the updated lower layer. Then the packets in the updated lower layer are checked to determine if they relate to transactions already under way on the current upper layer or new transactions. The current upper layer processes the packets relating to transactions already under way, and the packets relating to new transactions are processed the updated upper layer. When all the under-way transactions on the current upper layer have been completed the communication channel is closed.

8 Claims, 2 Drawing Sheets

U.S. PATENT DOCUMENTS 5,410,703 A * 4/1995 Nilsson et al. ............... 717/168
6,101,327 A * 8/2000 Holte-Rost et al. .......... 717/170
6,141,795 A   10/2000 Laugner ..................... 717/170
6,856,317 B2 * 2/2005 Konsella et al. ............. 345/471

OTHER PUBLICATIONS

Gorinsek, J.; Van Baelen, S.; Berbers, Y.; De Vlaminck, K.; Leuven, K.U. "Managing quality of service during evolution using component contracts." Mar. 10, 2003.*

* cited by examiner

METHOD FOR UPGRADING NETWORK SERVER PROGRAMMING CONDITIONS, ASSOCIATED SYSTEM AND SOFTWARE PRODUCT

CROSS-REFERENCE TO RELATED APPLICATIONS

This application is the US national phase of PCT application PCT/IT02/00152 filed 12 Mar. 2002 with a claim to the priority of Italian patent application TO2001A000264 filed 21 Mar. 2001.

FIELD OF THE INVENTION

The present invention relates to networks involving the use of the servers; more particularly, the invention relates to the function for updating the programming conditions for these servers, or in other words, the function currently indicated as "software upgrade." In particular, the method in accordance with the invention was developed with specific attention to potential application in servers which manage transactions and retain a state whose loss can cause permanent or temporary malfunctions.

BACKGROUND OF THE INVENTION

In cases where it is necessary to guarantee that a service be performed uninterruptedly or with a minim number of interruptions, server software upgrades are especially delicate, as service unavailability may result.

In this connection, and in order to ensure a certain degree of fault tolerance, the commonly used solution is to replicate the servers. When an upgrading operation is performed, the server or servers involved in this operation are made temporarily unreachable, typically by eliminating databases whereby these servers can be located, for example by means of a Domain Name Server (DNS) mechanism, and transferring the load to the servers which remain active.

The main disadvantages of this solution are as follows:

It is not always easy to determine when a server can be deactivated: it is necessary, in fact, to ensure that there are no transactions in progress, and that any local copies of the server lists in the units acting as clients do not contain references to the server in question; Another problem which is directly connected to this disadvantage is that administrative operations are always fairly slow, and in particularly urgent cases (e.g. when it is necessary to deal with potential security problems), the only possibility is to interrupt service temporarily. In addition, if the duration of the state maintained by the process exceeds that of a transaction and (as is frequently the case), the end of its valid lifetime cannot be readily identified, the state may be lost, causing temporarily malfunction, and Finally, if (as occurs in most cases) it is difficult to predict traffic trends and a traffic peak takes place during the upgrading operation, the servers which remain active may encounter difficulties in handling their workload: the only way to prevent this problem is to deploy at least one machine in addition to those which would be sufficient under normal circumstances, which entails an increase in system redundancy which would not be strictly necessary otherwise.

OBJECT OF THE INVENTION

The object of the present invention is thus to provide a solution capable of overcoming the problems outlined above.

SUMMARY OF THE INVENTION

In accordance with the present invention, this object is achieved by means of a method having the characteristics detailed below. The invention also relates to the associated system, or in other words to the system configured to operate on the basis of the above-described method, as well as to the corresponding software product, or in other words to the code which, loaded in a computer and run thereon, makes it possible to configure the computer in question so that it can operate on the basis of the above-described method.

Essentially, the solution in accordance with the invention involves "hot" server process replacement, proceeding in such a way that the current process which is replaced coexists for a certain period of time with its updated replacements. The duration of this operation is decided by the replaced current process, thus guaranteeing that the operation will always take place after the end of the last transaction. Any state information whose lifetime is longer can be passed from one process to the other, for example by means of a socket or another bidirectional inter-process communication mechanism.

BRIEF DESCRIPTION OF DRAWINGS

The following description of the invention, which is intended purely by way of example and is not to be construed as limiting, will make reference to the accompanying drawings, where.

SPECIFIC DESCRIPTION

Figure 1:
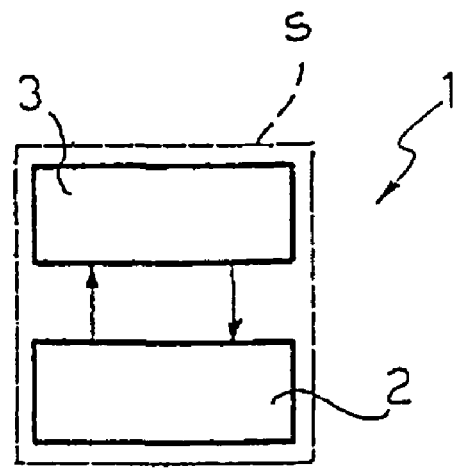
FIG. 1 is a functional block diagram illustrating the normal operation of a server operating in accordance with the invention.
Figure 2:
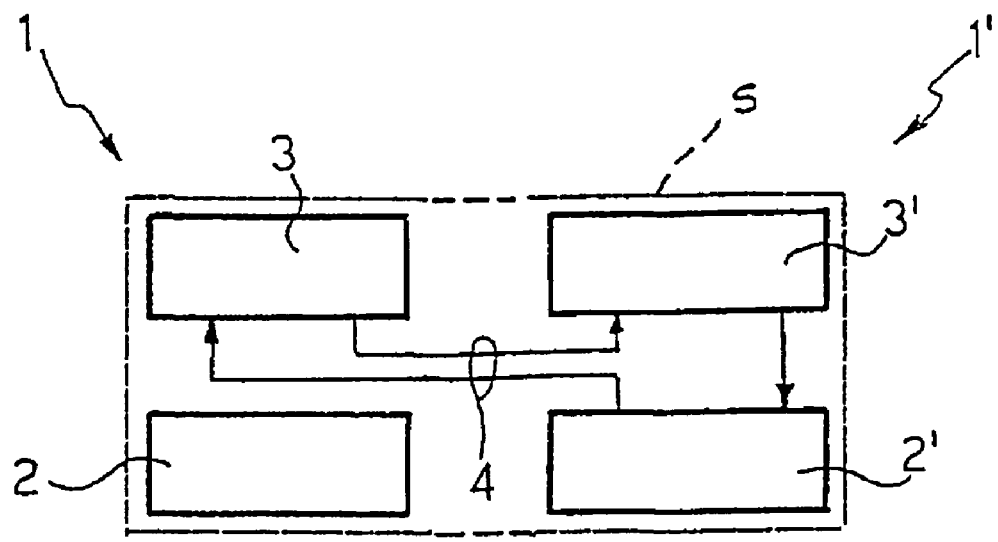
FIG. 2 is a further functional block diagram using the same format as FIG. 1 which illustrates how the server upgrading operation depicted in FIG. 1 is performed.

FIG. 1 provides a schematic illustration of the general configuration of a server S. The latter may, for example, be a server used in a telecommunications network to perform the SIP (Session Initiation Protocol) proxy function.

For example, it may be an Enterprise server produced by Sun Microsystems of Palo Alto (CA), using the Solarium operating system.

The server S is capable of carrying out processing operations such as the current processing operation designated in its entirety as 1.

operation 1 comprises: A lower current layer (or level—the two terms will be regarded hereunder as equivalent) 2 which interfaces directly with the network in order to ensure packet reception/transmission, and An current upper layer 3 which processes the packets, receiving them and passing them to the lower layer.

The two current layers 2 and 3 are interfaced in a general bidirectional communication scheme as represented by the arrows.

As it is understood that all of the foregoing points correspond to configuration and application criteria which will be entirely familiar to persons skilled in the art, it is unnecessary to provide a detailed description here.

In updating the server's programming conditions (or in other words, in the so-called software upgrade operation), the current configuration, designated as 1, must be replaced with an updated configuration designated in its entirety as 1' and likewise organized into an updated lower layer 2' and an updated upper layer 3', which will substitute the corresponding current layers 2 and 3 at the end of the updating or upgrade operation.

The method in accordance with the invention is intended to ensure that the operation of substituting or replacing the current process 1 with its updated version 1' is entirely transparent to the network, or in other words takes place in such a way that the clients with whom the server S is interfaced are unable in practice to detect that the upgrading operation has been started and that this operation is in progress.

All of this is accomplished while guaranteeing that the transactions in progress will be managed normally, even in cases where the duration of the state maintained by the process exceeds that of the transaction (which frequently makes it impossible to identify the end of the valid lifetime with any degree of ease), and avoiding any difficulties that could arise following an unforeseen traffic peak.

The updating operation first envisages that the process corresponding to the update or upgrade 1' connect to the current process 1 which must be replaced by means of a socket or other IPC mechanism designated in its entirety as 4, authenticating itself.

Naturally, the current process 1 which is to be replaced also checks that the upgrading operation is carried out by the same machine S.

The current process 1 which is to be replaced releases its ports (lower layer 2). These ports are immediately acquired by the corresponding layer 2' of the upgraded process 1', which is configured so that the packet flow it receives can be selectively diverted preparatory to forwarding it to the upper layer 3 of the current process 1 through the channel 4.

The packets arriving from the networks are then received exclusively by the lower layer 2' of the upgraded process 1'.

These packets are, in any case, also passed to the upper layer 3 of the process 1 which is then being replaced. The latter is thus put into a position to act, as it were, as a filter: if the messages concern new transactions (or in other words, transactions which started after the beginning of the upgrading operation), they are transferred directly—without being processed—to the corresponding upper layer 3' of the upgraded process 1'. Conversely, if the messages concern transactions which are already under way at the upper layer 3 of the process 1 which is being replaced, they continue to be processed by this upper layer 3.

At the same time, the two processes 1 and 1' can exchange state information which is not connected with transactions.

When the upper layer 3 of the process 1 which is being replaced determines that all of the transactions it manages have ended, a signal is generated to indicate that the upgrading operation has been completed. This signal, transmitted on channel 4, ensures that the lower layer 2' of the upgraded process 1' sends no further packets or messages of any kind to the upper layer 3 of the process 1 which has been upgraded. The communication channel 4 is closed and, consequently, the upgraded process 1' has at this point replaced process 1 in all respects, and process 1 is deactivated.

Figure 3:
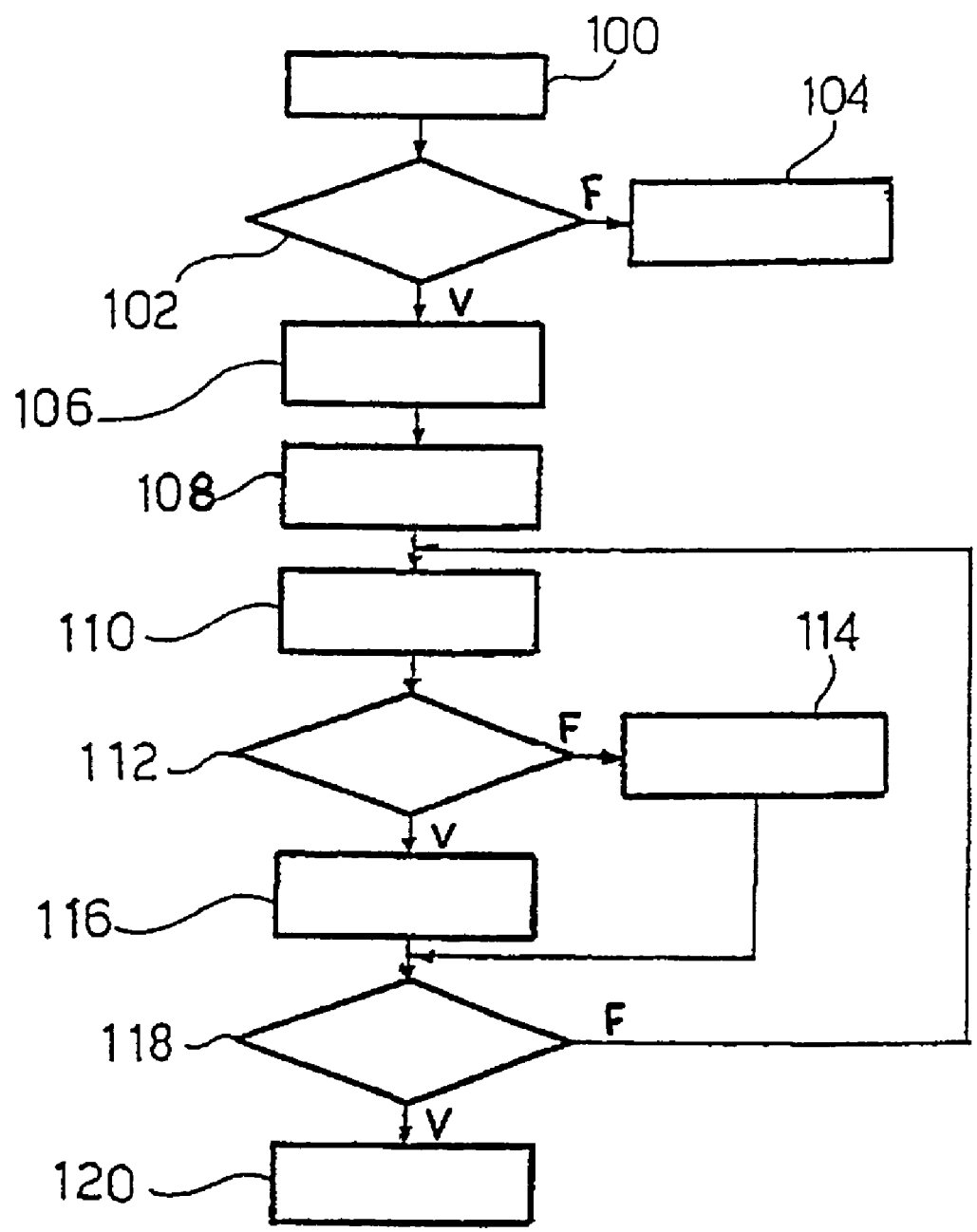
FIG. 3 is a flow chart illustrating how the operation depicted in FIG. 2 is performed.

The steps employed in carrying out the upgrading operation described above are illustrated in greater detail in the flow chart shown in FIG. 3.

In this flow chart, the reference 100 designates the first step in the upgrading operation, which corresponds to opening the connection 4.

The reference 102 designates the step in which the current process 1 checks that upgrading is performed on the same machine.

When the outcome of this check is negative (outcome F), the upgrading operation is not followed through and is interrupted at step 104.

When the outcome of the check carried out at step 102 is positive (outcome V), the system ports (or in practice the interface with the network) are transferred—in step 106—from the lower layer 2 of the current process 1 to the lower layer 21 of the upgraded process 1', with the subsequent transfer—carried out at step 108—of the state information.

From this moment onwards, the operating condition is established in which the messages concerning transactions which are already under way continue to be handled by the current process 1, while the messages concerning new transactions are handled by the upgraded process 1'.

In particular, the reference 110 designates the step in which a new message is read, while reference 112 designates the step in which a check is carried out to determine whether the packet that has just been read concerns a known transaction or a new transaction.

Where the message concerns a new transaction (outcome F of step 112), the packet is identified as regarding a "new" transaction and is thus handled by the upgraded process 1' in a step 114.

In cases where the message that has been read is identified as corresponding to a transaction which is already known (outcome V of step 112), it is handled by the current process 1 in is a step 116.

Starting from both steps 114 and 116, the upgrading operation continues, converging towards a further step designated as 118, in which it determines whether the transactions for the process which is being replaced, or in other words the current process 1, are to be regarded as finished.

Should there still be transactions which have not yet been completed (outcome F of step 118), system operation returns upstream of step 110 again, given that a new packet is to be read.

Conversely, if the transactions that must be handled by the process 1 which is being replaced have been terminated (outcome V of step 118), the system goes on to a final step designated as 120, in which the commination channel 4 is closed, thus completing the upgrading operation.

Naturally, and without detriment to the inventions underlying principles, details and forms of implementation may vary widely with respect to the descriptions and illustrations provided herein, without for that reason failing to fall within the scope of the present invention.

For instance, possible variations, which are intended purely by way of example and are not to be construed as limiting in any respect, on the general approach described above with reference to FIGS. 1 and 3 could include those in which: The communication mechanism identified by the channel 4 is not a socke. What is essential is that, in general, the channel permit bidirectional communications, and that it likewise make it possible to establish with certainty where the other process is being performed; and The initial mechanism-whereby the lower layer 2 is substituted or replaced by the lower layer 2' is applied, in addition or as an alternative to the ports, to other dedicated resources used exclusively for the input/output functions.

Essentially, the method in accordance with the invention is applied in all situations in which the duration of the service interruption must be minimal (virtually nil) and it is not possible to identify a period in which the traffic handled is reasonably low.

The invention claimed is:

1. A method for upgrading software resident on a network server, the software comprising at least one current process having a current lower layer for interfacing with network packets and a current upper layer for processing said packets, the method comprising:
  providing an updated process comprising:
    an updated lower layer for interfacing with network packets,
    an updated upper layer for processing said packets, and
    a communication channel associated with the updated upper layer for diverting the network packets from the updated lower layer to the current upper layer,
      wherein the communication channel connects the current upper layer to the updated upper layer,
      wherein diverting packets relating to new transactions from the updated lower layer to the updated upper layer comprises forwarding the network packets from the updated lower layer to the current upper layer to the updated upper layer,
  replacing the current lower layer with the updated lower layer,
  diverting packets from the updated lower layer to the current upper layer via the communications channel,
  checking on the current upper layer whether the packets received from the updated lower layer relate to transactions already under way on the current upper layer or to new transactions and diverting packets relating to new transactions from the current upper layer to the updated upper layer via the communications channel,
  processing in the current upper layer the packets relating to transactions already under way on the current upper layer,
  processing the packets relating to new transactions with the updated upper layer,
  determining whether the transactions already under way on the current upper layer have been completed, and
  closing said communication channel and thereby completing the programming upgrade for the server when said transactions already under way on the current upper layer have been completed.

2. The method in accordance with claim 1 further comprising checking with a view to carrying out said software upgrade that said software upgrade is carried out on a single server.

3. The method in accordance with claim 1 wherein said replacing the current lower layer with the updated lower layer comprises transferring the network ports of the current lower layer to the updated lower layer.

4. The method in accordance with claim 1 further comprising configuring said communication channel to exchange state information between the current process which is to be upgraded and the upgraded process.

5. The method in accordance with claim 1 further comprising configuring said communication channel as a socket.

6. A network server configured to upgrade the programming conditions using a method for upgrading software resident on a network server, the software comprising at least one current process having a current lower layer interfacing with network packets and a current upper layer for processing said packets, the method comprising:
  providing an updated process comprising:
    an updated lower layer for interfacing with network packets,
    an updated upper layer for processing said packets, and
    a communication channel associated with the updated upper layer for diverting the network packets from the updated lower layer to the current upper layer,
      wherein the communication channel connects the current upper layer to the updated upper layer,
      wherein diverting packets relating to new transactions from the undated lower layer to the undated upper layer comprises forwarding the network packets from the updated lower layer to the current upper layer to the updated upper layer,
  diverting packets from the updated lower layer to the current upper layer via the communications channel,
  checking on the current upper layer whether the packets received from the updated lower layer relate to transactions already under way on the current upper layer or to new transactions and diverting packets relating to new transactions from the current upper layer to the updated upper layer via the communications channel,
  processing in the current upper layer the packets relating to transactions already under way on the current upper layer,
  processing the packets relating to new transactions with the updated upper layer,
  determining whether the transactions already under way on the current upper layer have been completed, and
  closing said communication channel and thereby completing the programming upgrade for the server when said transactions already under way on the current upper layer have been completed.

7. A server in accordance with claim 6 wherein said server is a Session Initiation Protocol proxy.

8. A computer-readable medium comprising computer program code executable by a computer, the computer program code configured to perform a method for upgrading software resident on a network server, the software comprising at least one current process having a current lower layer interfacing with network packets and a current upper layer for processing said packets, the method comprising:
  providing an updated process comprising:
    an updated lower layer for interfacing with network packets,
    an updated upper layer for processing said packets, and
    a communication channel associated with the updated upper layer for diverting the network packets from the updated lower layer to the current upper layer,
      wherein the communication channel connects the current upper layer to the updated upper layer,
      wherein diverting packets relating to new transactions from the updated lower layer to the updated upper layer comprises forwarding the network packets from the updated lower layer to the current upper layer to the updated upper layer,
  diverting packets from the updated lower layer to the current upper layer via the communications channel,
  checking on the current upper layer whether the packets received from the updated lower layer relate to transactions already under way on the current upper layer or to new transactions and diverting packets relating to new transactions from the current upper layer to the updated upper layer via the communications channel,
  processing in the current upper layer the packets relating to transactions already under way on the current upper layer,
  processing the packets relating to new transactions with the updated upper layer,
  determining whether the transactions already under way on the current upper layer have been completed, and
  closing said communication channel and thereby completing the programming upgrade for the server when said transactions already under way on the current upper layer have been completed.

* * * * *

UNITED STATES PATENT AND TRADEMARK OFFICE
CERTIFICATE OF CORRECTION

PATENT NO. : 7,644,189 B2  Page 1 of 1
APPLICATION NO. : 10/472416
DATED : January 5, 2010
INVENTOR(S) : Canal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1331 days.

Signed and Sealed this

Sixteenth Day of November, 2010

David J. Kappos
*Director of the United States Patent and Trademark Office*